Oct. 18, 1927.

F. R. WHITE ET AL 1,645,564

DEVICE FOR EXPANDING AND CONTRACTING SPLIT RIMS

Filed Jan. 11 1926

Inventors
Frank R. White
Chancy Lum
By Martin & Rendell

Attorneys

Patented Oct. 18, 1927.

UNITED STATES PATENT OFFICE.

FRANK R. WHITE AND CHANCY LUM, OF COLUMBIA, NEW YORK; SAID WHITE ASSIGNOR TO SAID LUM.

DEVICE FOR EXPANDING AND CONTRACTING SPLIT RIMS.

Application filed January 11, 1926. Serial No. 80,491.

Our present invention relates to devices for expanding and contracting split rims for automobile tires.

The purpose of this invention is to provide a device of the character described which is simple, strong and economical in construction, readily and quickly operated and of sufficient power to readily perform the work required.

A further purpose is to provide a device of the character described which is adapted not only to expand a split rim but also to contract the same when required and to perform both of these operations in such manner that the rim is not permanently strained nor distorted out of its true circular shape nor twisted laterally.

Another object of our invention is to provide a rim expander or contractor comprising a nearly complete ring directly fitting against the inside of the rim and so distributing the strain evenly there-along during expanding of the ring and greatly reinforcing the rim during contraction thereof; and to have said ring formed of over-lapping detachable sections so that the ring may be stored in a small compact space when not in use, but may be readily assembled when required; and further to have said detachable sections also adjustable so that one stock form of the device will be readily adjustable to a very considerable range of sizes of rims.

Further purposes and advantages of our invention will appear from the specification and claims herein.

Figure 1:
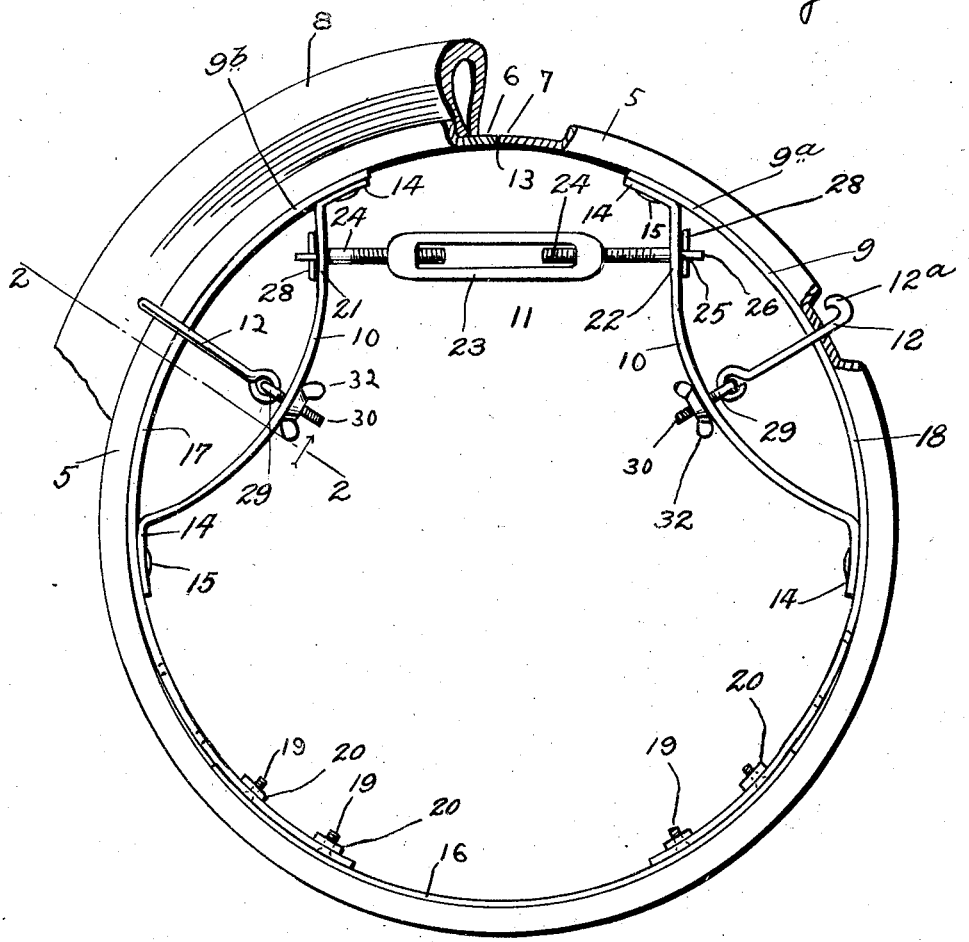
Figure 2:
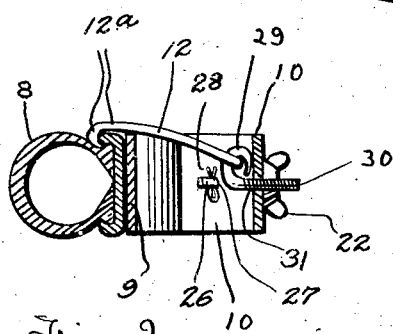

Fig. 1 is a side view of a device embodying our invention as applied to a split rim with portions of the rim cut away. Fig. 2 is a sectional view on line 2—2 of Fig. 1.

It will be seen that this device is intended particularly to be used in connection with split rims 5 having their meeting ends 6 and 7 normally in alignment when the tire 8 is in place thereon, but adapted to have one end, say 6 sprung inside the other end 7 and then to have the said rim 5 contracted bodily with said end 6 passing back for some distance along the end 7 until the rim is contracted sufficiently to remove the tire 8 therefrom.

Our device consists of a nearly complete ring 9 adapted to fit within the rim 5, bow-shaped brackets 10, one at or near each end of the ring 9 with screw-threaded means generally designated by the numeral 11 connecting the portions of the said brackets nearest the interruption in the ring. Upon the device are also two hooks 12 attached to the bow-shaped brackets and adapted to engage the rim 5 when the device is to be used to contract the rim.

The ring 9 is formed of strong strip or band metal bent or shaped to the circle of proper size, said ring being formed of such metal and of such sized parts that the said ring is strong enough to aid in supporting all portions of the rim when the rim is being expanded and also contracted, but to have said ring sufficiently resilient to be itself expanded or contracted as it is being used to perform the respective operations of expanding or contracting the rim by means of the screw-threaded or other operating means 11. The ring 9 will be somewhat less than a complete circle and the interruption in its circle will be placed directly against the split 13 in the rim 5 being the line where the ends 6 and 7 of said rim abut.

Adjacent the extremities of the ring 9 there are provided and securely fastened to the inner side of said ring the two bow-shaped brackets 10. The extremities or feet 14 of these brackets are curved to fit the inner side of the ring 9 and are permanently fastened thereto as by rivets 15. The intermediate portion of the brackets curve inwardly and the brackets extend for say a fifth or a quarter of the periphery of the circle of the ring providing ample space as indicated in the drawings for the mounting upon said brackets of the hooks 12 and parts of the adjusting means 11. These brackets 10 also perform the function of appreciably bracing or stiffening the end parts of the ring 9 so that the contracting or expanding force from the operating means 11 will not act locally upon the opposite ends 9ª and 9ᵇ of the ring 9 adjacent the connected ends of the operating means 11, but will distribute the expanding and contracting force well back upon the ring 9 so that the member 9 at any size to which it is forced by the operating means 11 will be substantially circular. The portions of the ring 9 opposite the brackets 10 and also the brackets 10 will bend or straighten out somewhat as the ring is contracted or expanded, but the presence of these brackets will keep such bending and straightening out of these portions of the ring to about the same extent as is present in the inner half of the ring, that is the part of the ring having no brackets attached thereto.

Preferably the ring 9 is formed in detachable sections so that the device may be readily taken apart and packed in a small compass or readily assembled and also to enable a given stock size of the device to be readily adjusted to various sizes of rims used with different sizes of tires. Preferably and most conveniently, therefore, the ring 9 will be formed of three portions, namely the intermediate portion 16 and the two end portions or bracket bearing portions 17 and 18. The bracket bearing portions 17 and 18 extend towards the central portion 16 for some distance past the adjacent end of the bracket 10 so as to give ample overlapping length relative to the intermediate portion 16. In the overlapping portions between these pieces 16 and 17 or 16 and 18 are provided a plurality of round holes so that countersunk headed screws 19 may be passed from the outside through the said parts to receive nuts 20 on the inside of the ring.

Near the opposing ends 19$^a$ and 19$^b$ of the ring just back from the feet 14 of the brackets the two brackets have substantially parallel portions as 21 and 22. These parts of the brackets are connected by the screw-threaded operating means 11. Preferably this will consist of a turn buckle 23 having its opposite ends engage in the usual way oppositely threaded rods 24. The outer ends of these rods are reduced in diameter providing a shoulder 25 bearing against the side of the brackets towards the center of the ring while the extremity 26 of said rod 24, being of reduced diameter, extends through a hole 27 in the bracket and receives in the space within the bracket a split pin or other convenient detachable fastening member 28 adapted to communicate drawing pressure from the turn buckle to the said brackets. Assuming that the device is to be used to expand a rim the turn buckle 23 will be rotated so as to force the brackets 10 apart and thereby the whole ring 9 will be gradually expanded by reason of the shoulders 25 of the threaded rods 24 forcing the brackets apart.

The hooks 12 are swingingly and preferably adjustably fastened to the central portion of the brackets 10 by means of screw eyes 29 having their shank portions 30 mounted in holes 31 in the bracket and receiving thumb nuts 32 on the ends of said shank towards the center of the ring. Preferably the eye 29 will be offset appreciably from the shank 30 so as to carry the hook 12 out a considerable distance so that the shank of said hook may pass the ring 9 without touching the same and have its end 12$^a$ engage the flanged or other outer edge of the rim 5. Assuming that the device is to be used first to contract a rim from a tire, the three sections of the ring will be adjusted to approximately the proper diameter of the rim, the hooks 12 will be placed against the adjacent flanged or other edge portions of the rim 5 and the hooks then drawn up by means of the thumb nuts 32 to insure the ends 6 and 7 of the rim contracting with the ring 9. If not already done, the end as 6 of the rim will then be pried or offset past the opposite end 7 of the rim and at once the turn buckle 23 will be rotated in the proper direction to exert a drawing force upon the brackets 10 which will be communicated to the whole ring and therefrom through the hooks 12 to the rim 5. After the rim has been sufficiently contracted to remove the tire the device may be left upon the rim if desired ready for the return of the tire to the rim. In expanding the rim either with or without the tire thereon the proceeding will be reversed, that is the turn buckle 23 will be turned to exert a pushing force upon the brackets 10 which will be distributed to the whole ring and in turn the entire rim will be expanded while its circular shape is maintained.

What we claim as new and desire to secure by Letters Patent is:

In a device for expanding and contracting split rims for automobile tires, the combination of a nearly complete slightly resilient ring adapted to fit within the rim with its ends spaced from the split in the rim, a bow-shaped bracket near each end of said ring connected at both its extremities to said ring and projecting from the inner side thereof, a hook connected at its base to each bracket intermediate its extremities and adapted to be hooked against the outer face of the opposite portion of the rim and screw-threaded means connecting the brackets across the interruption in the ring and adapted to expand and to contract the ring and a rim thereon.

In witness whereof we have affixed our signatures, this 9th day of December, 1925.

FRANK R. WHITE.
CHANCY LUM.